Figure 1:
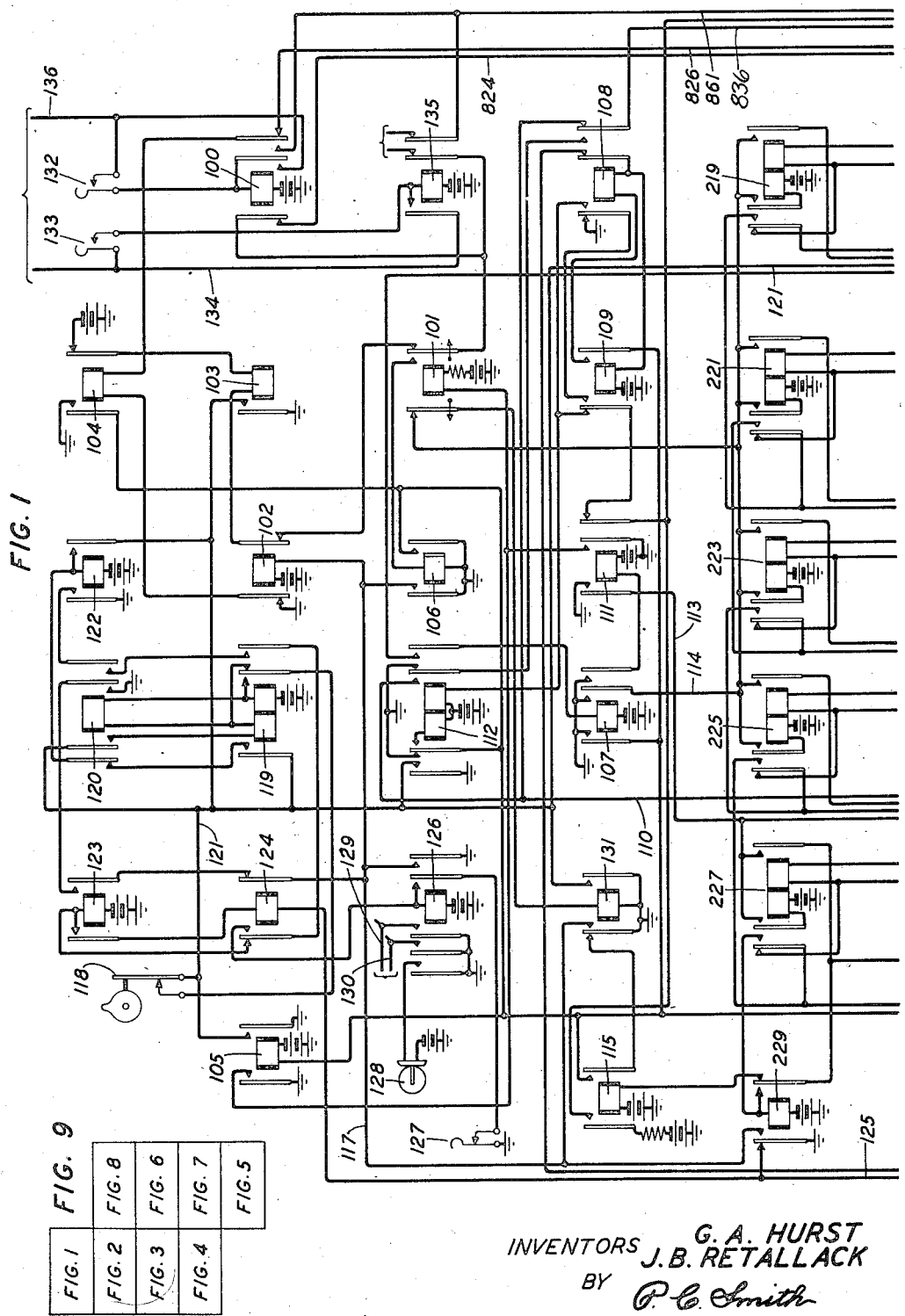

April 28, 1936. G. A. HURST ET AL 2,039,001
TESTING SYSTEM
Filed Sept. 8, 1934   8 Sheets-Sheet 8

INVENTORS G. A. HURST
J. B. RETALLACK
BY P. C. Smith
ATTORNEY

Patented Apr. 28, 1936

2,039,001

UNITED STATES PATENT OFFICE 2,039,001

TESTING SYSTEM

George A. Hurst, New York, N. Y., and John B. Retallack, Millburn, N. J., assignors to Bell Telephone Laboratories, Incorporated, New York, N. Y., a corporation of New York Application September 8, 1934, Serial No. 743,180

18 Claims. (Cl. 179—175.23)

This invention relates to dial telephone exchange systems and has for its object to increase the accuracy with which the operation of such systems may be controlled.

In large exchange areas it has become the usual practice to charge the calling subscriber in proportion to the elapsed time of the conversation and the dial equipment which completes the connection is equipped with means for timing the duration of the calls and performing the metering functions at predetermined intervals. Since this apparatus is without manual supervision, it is necessary that it be maintained in good working order and to insure this, routine testing equipment has been devised for thoroughly testing the functioning of every part of the dial equipment. However, since complete testing requires a considerable time for completion, the individual pieces of apparatus are tested only at intervals. Because of its unfavorable reaction on public relations, it is especially desirable that no overcharge be made. A large proportion of the calls being terminated within the first conversational period, means for rapidly determining that the equipment is charging for and timing this period accurately would minimize likelihood of overcharge.

In accordance with the present invention, means are provided for simultaneously seizing a plurality of the conversational links with which the call charging equipment is associated, for simultaneously performing a timing and metering test thereon and, if the response is satisfactory, seizing another plurality of links and testing them.

More specifically, the invention provides for simultaneously initiating the establishment of connections over a plurality of district selectors, simultaneously giving a completed connection indication to each selector and using the first metering operation resulting to start an accurate timing operation. If none of the selectors performs a second metering operation prior to the completion of the time interval, another group of selectors is tested but if a second charge is received falsely, the selector making the false charge is held operated and the testing is stopped but the selectors operating properly are released at the termination of the measured time interval.

A district selector of the type employing automatic metering is disclosed and claimed in Patent 1,859,924 to L. H. Johnson et al. granted May 24, 1932.

Figure 2:
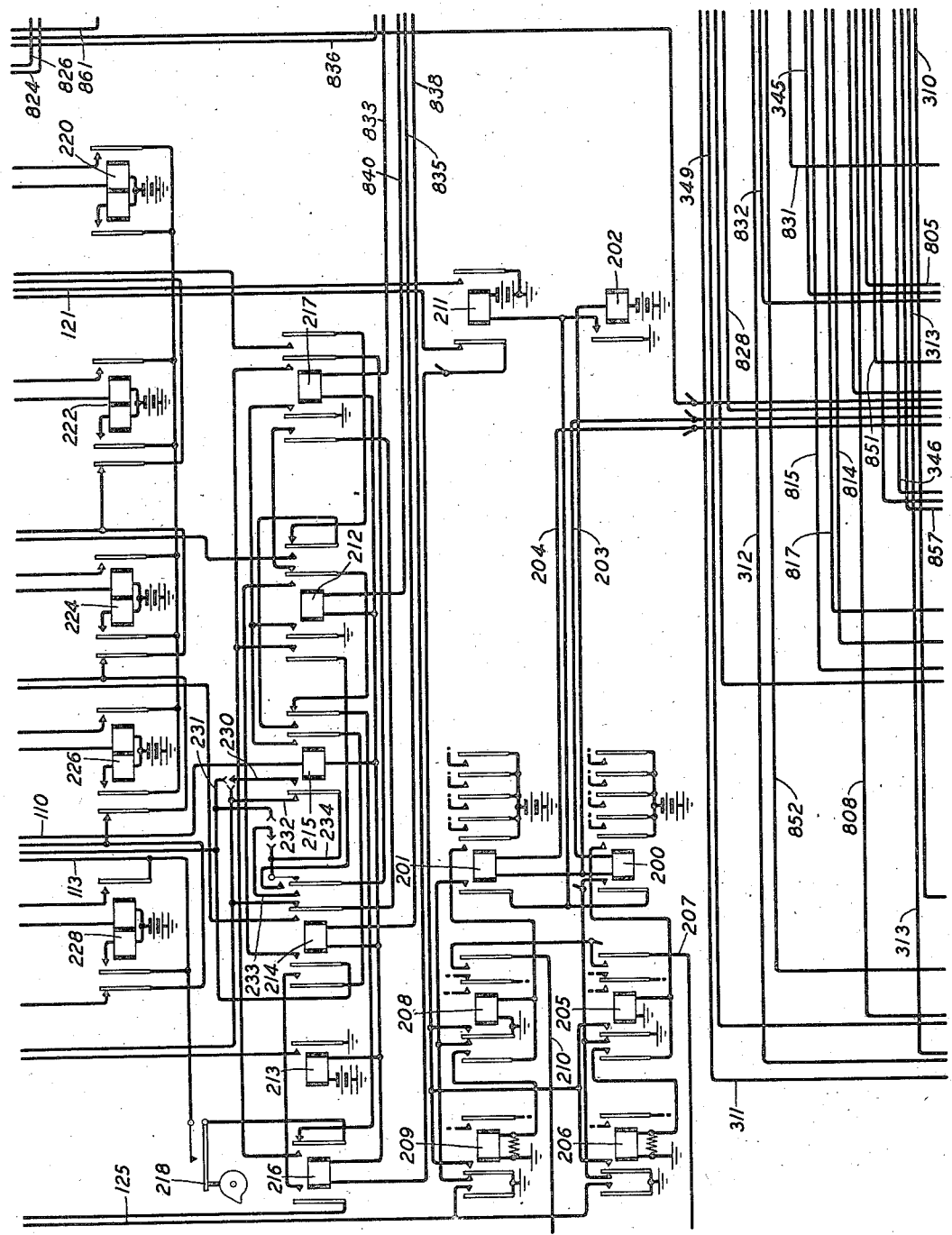
Figure 3:
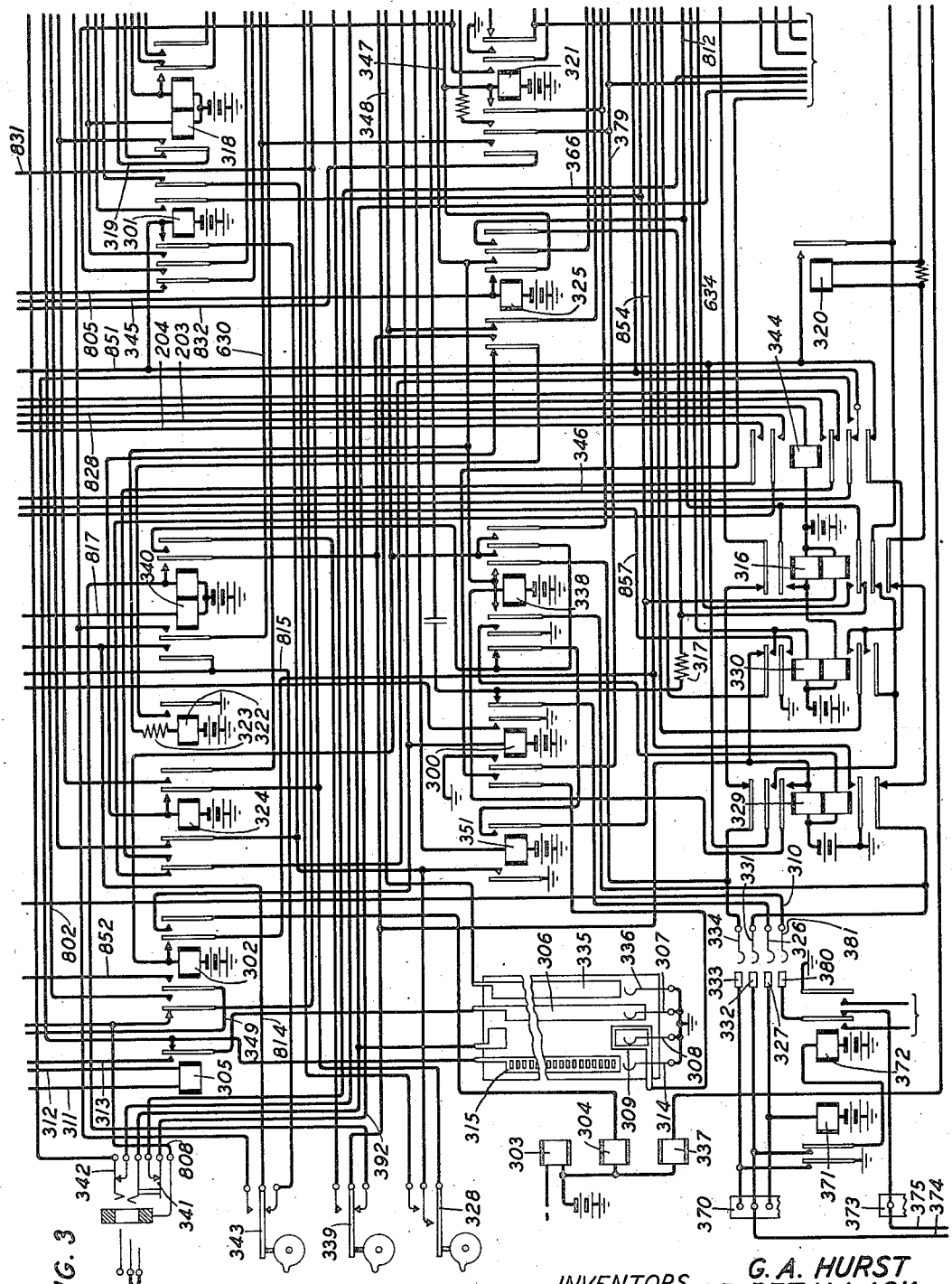
Figure 4:
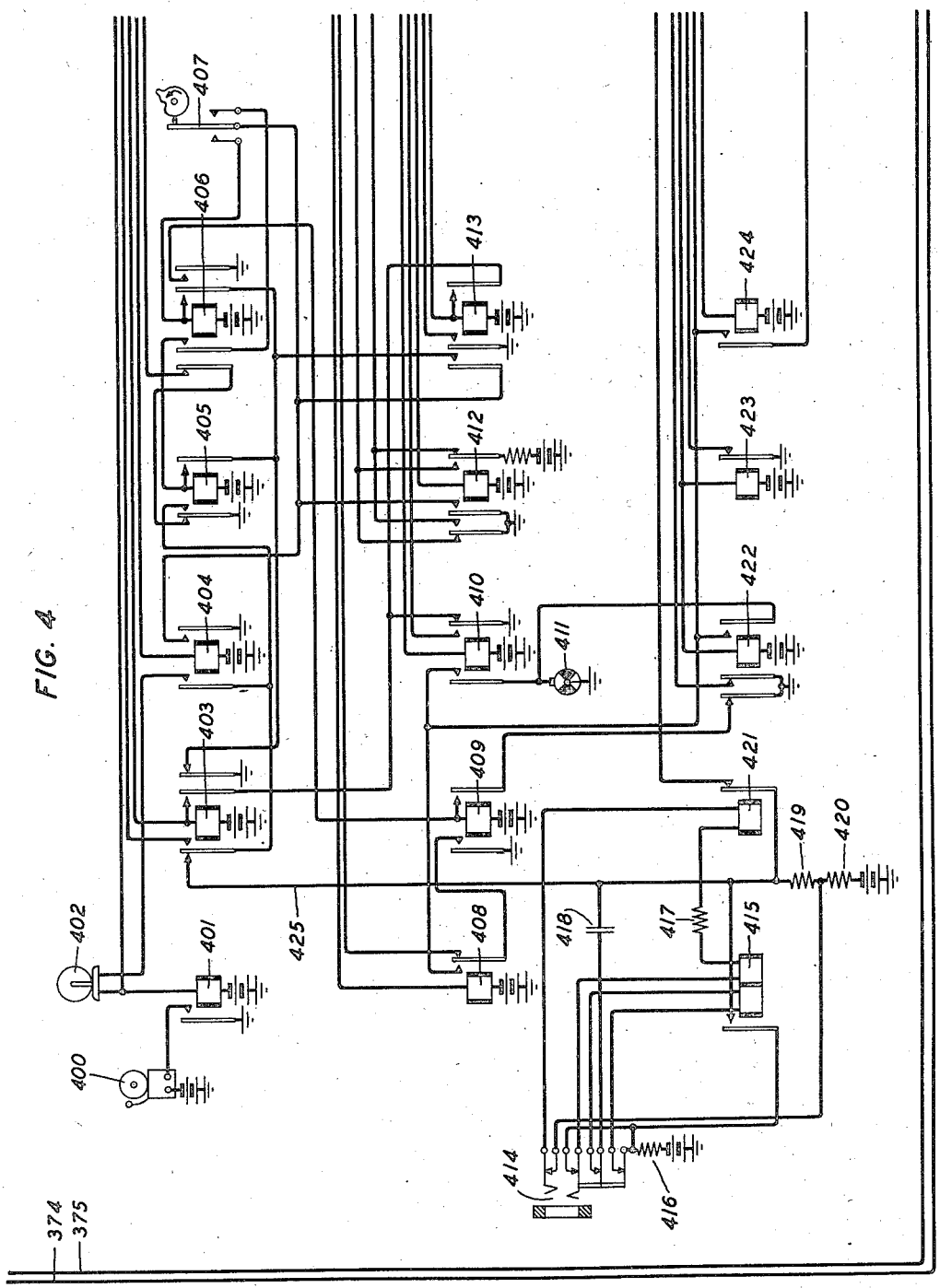
Figure 5:
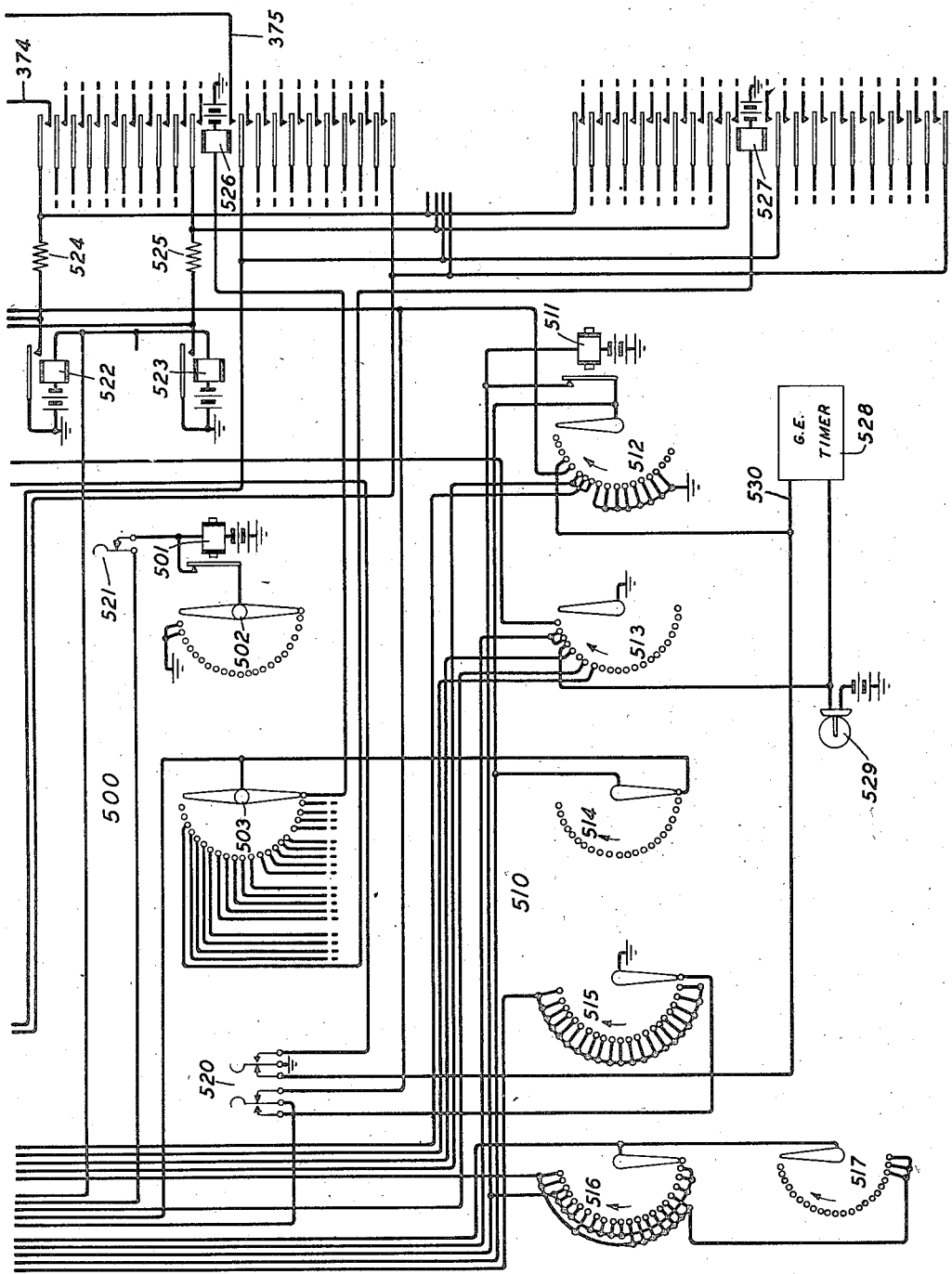
Figure 6:
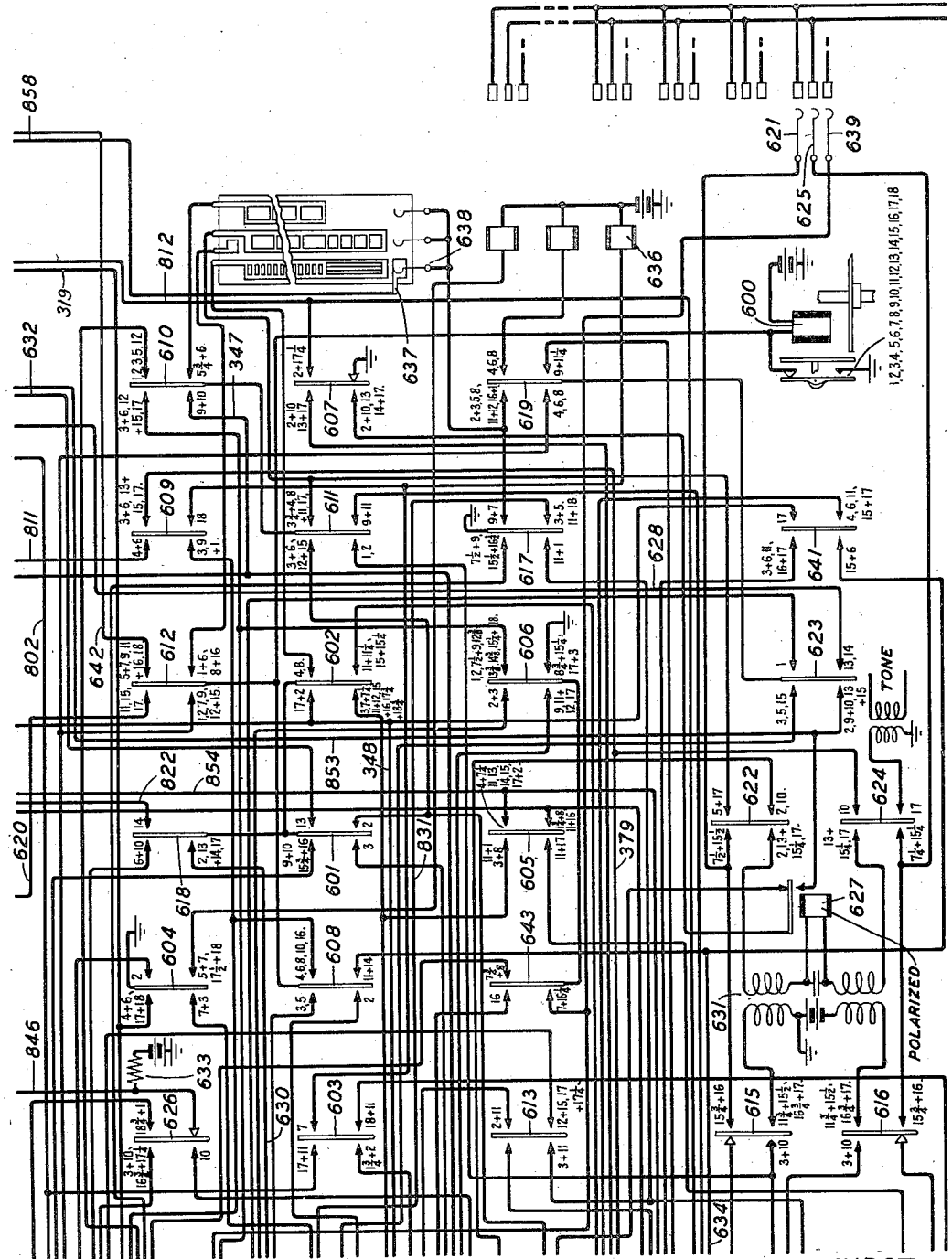
Figure 7:
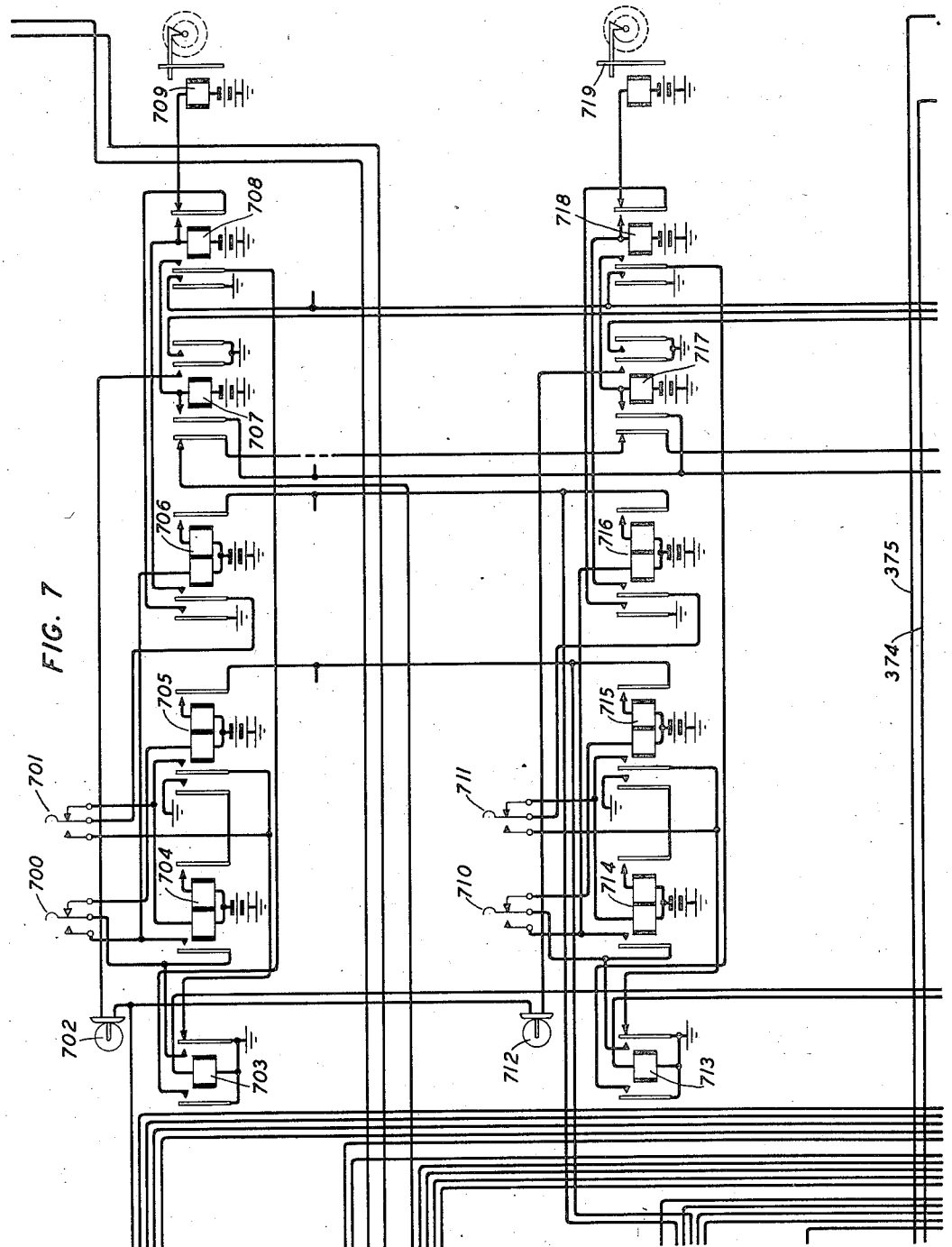
Figure 8:
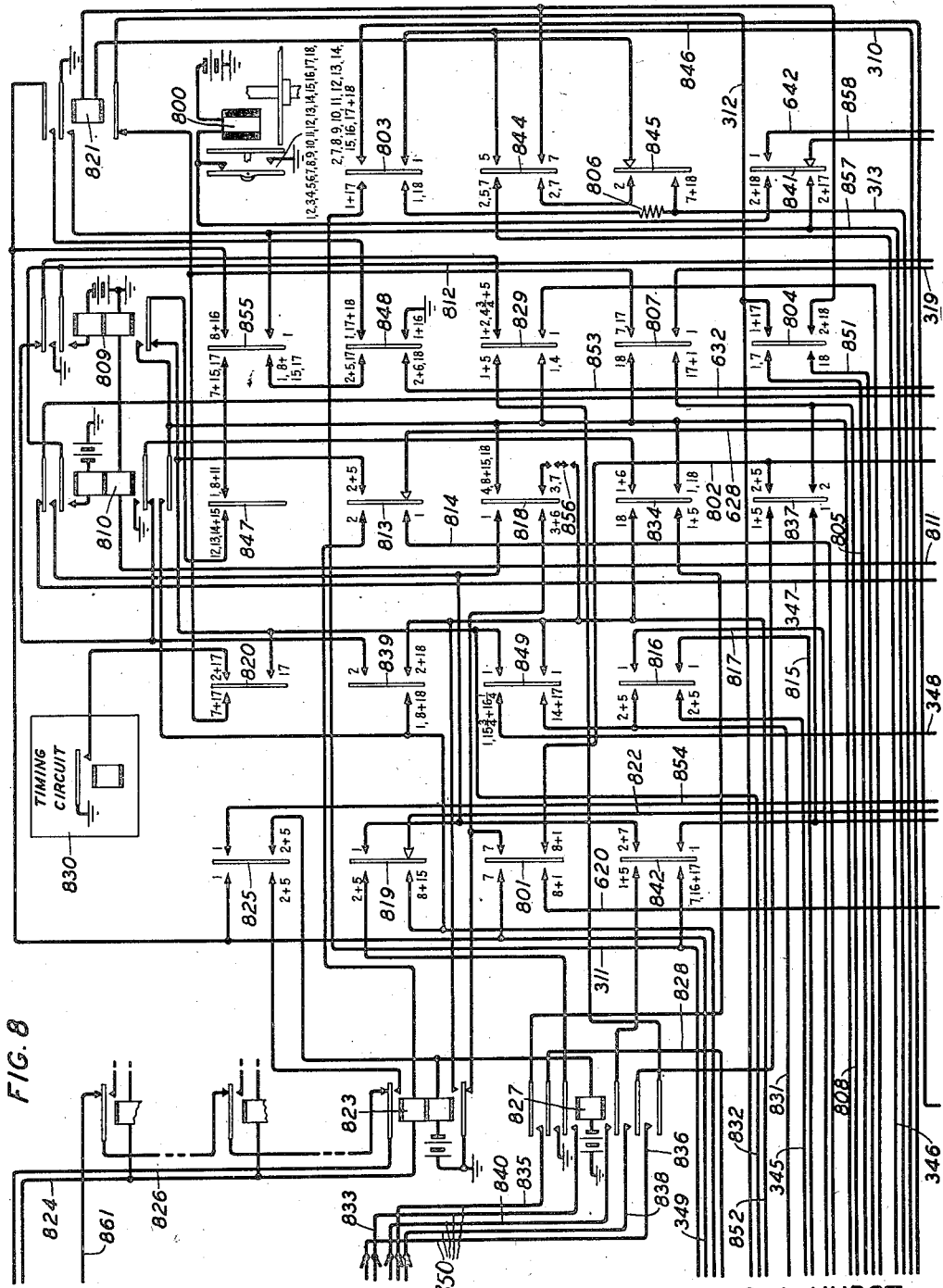

A clearer understanding of the invention will be obtained from a consideration of the following description in connection with the drawings in which:

Figs. 1 and 2 disclose the message register connector circuit for connecting the message register of the calling party line substation into an operating circuit and for controlling the manner in which the connected message registers shall be operated for calls to different zones;

Figs. 3 and 6 taken together show a line finder-district selector link circuit, Fig. 3 showing the line finder and Fig. 6 the district selector;

Figs. 4, 5 and 7 disclose the equipment for checking the registration and timing of calls;

Fig. 8 shows the timing switch individual to the line finder-district selector link of Figs. 3 and 6; and Fig. 9 shows the manner in which the other figures should be arranged.

Figs. 1, 2, 3, 6 and 8 are essentially copies of Figs. 3, 6, 8, 9 and 10 of the above identified patent to Johnson et al. In Figs. 3, 6 and 8, the same numbers are used to identify the various portions of the circuit as are used in the Johnson patent, while in Figs. 1 and 2, the hundreds digits 1 and 2 have been substituted for the prefixes 10 and 9, respectively, in the identifying numbers in order to facilitate reference to that patent.

A brief review of the operation of the district selector will simplify the description of the operation of the system as a whole. Assuming that the district selector of Fig. 6 has been associated with a link circuit and that the district selector link circuit combination has been allotted for use, sequence switch 600 will be standing in position 2. The initiation of a call by one of the lines served by this selector will cause the trip and start circuit individual to the line group to function, operating relay 302 which in turn operates the updrive magnet 304 in the line finder. At the same time, the sender finder of the link circuit is actuated to find an idle sender. When the link circuit starts hunting for an idle sender, relay 318 is operated, advancing sequence switch 600 into position 3 where busy ground is applied to the sleeve brush 326 to operate the cut-off relay of the calling line and release the line relay. When an idle sender has been found, the link circuit establishes the pulsing circuit for receiving dial pulses and transmits the dial tone from the sender to the calling subscriber who thereupon dials the wanted number.

As soon as the code registers of the sender have been positioned, the translator or decoder is operated to set up the proper selection control registration in the sender. It also sets up a zone registration in the sender and link circuit. The link circuit in turn transmits this registration to the district selector. For a call into zone 4 or 5, relays 809 and 810 would be operated; for a call into zone 2 or 3, relay 810 alone would be operated, and for a call into zone 0 or 1, neither of these relays would be operated. If either relay 809 or 810 is operated, it locks independent of the link circuit. Further discrimination is made from the registration in the sender which places the district selector in either position 13 or position 14 for talking.

The district selector is controlled by the sender in its brush and group selecting movements and proceeds to hunt for an idle trunk in the well known manner. After an idle trunk is selected, sequence switch 600 is advanced to position 10 which is the selection beyond position and control of the succeeding switches is effected. When selections are completed and the connection has been set up to the called subscriber's line, talking selection takes place, position 13 being the charge position for connections to zones 0, 2 and 4, position 14 for connection to zones 1, 3 and 5 and position 15 for connection to an operator's position. After the completion of talking selection, the sender and link circuits are dismissed. When the called subscriber responds after the application of ringing current to his line in the well known manner, relay 627 operates in turn operating relay 340. Relay 340 locks and, as soon as interrupter 343 closes its upper contact, establishes a circuit through the winding of the timing sequence switch magnet 800, advancing the sequence switch into position 2 where relay 340 is released.

When sequence switch 800 reaches position 2, the message register connector circuit is tested and if free is associated with the timing circuit of Fig. 8. The proper party relay 200 or 201 is operated to cause the connection of the proper party meter with the metering terminal in the line finder bank. A test is then made of the common conductors 850 extending through the windings of the zone relays in the connector circuit which, if successful, advances the timing sequence switch 800 into position 3, opening the test circuit and leaving that zone relay operated which corresponds to the zone registration set up in the district selector. Sequence switch 800 is advanced as a result of this test into position 5 where battery is connected to the metering terminal 380 a number of times to correspond to the zone selected. When the metering operation has been completed, sequence switch 800 is advanced to position 7, releasing the message register connector circuit. From position 8 to position 18, sequence switch 800 is advanced from position to position under the control of the office timing circuit 830 at thirty second intervals, thus measuring a maximum of five minutes. Circuits are provided for by-passing certain positions to shorten the time interval for the more distant zones.

When sequence switch 800 reaches position 18, a test is made to determine whether conversation is still in progress as indicated by the continued operation of relays 320 and 627. If these relays are operated, sequence switch 800 is advanced to position 1 and then to position 2 where the message register connector is again seized and a second charge is made.

When the calling subscriber hangs up to terminate the call, relay 320 releases and, after an interval, the timing sequence switch 800 and the control sequence switch 600 are advanced, the district selector and line finder are restored to normal and the selector is ready for selection by another link circuit.

As will appear hereinafter, the testing circuit is arranged to direct the district selector in a call to either zone 1 or zone 2 and to receive either one or two impulses of metering current. If a call to zone 1 is simulated, neither relay 809 nor 810 is operated and sequence switch 600 stands in position 14 for talking. Therefore, when the message register connector circuit has been selected and the common conductors have been checked, zone relay 217 will remain operated and one impulse of metering current is transmitted. For a call to zone 2, relay 810 is operated and sequence switch 600 is placed in position 13 for talking. Therefore, after the common leads have been checked, zone relays 214 and 212 remain operated and two impulses of metering current are transmitted.

Subscribers' lines are arranged in the line finder frame in five groups, each served by a different brush on the line finder shaft and each group is subdivided into two groups which have preferential service from half of the line finders serving the frame. For the purposes of the test to be described, one set of line terminals from each subgroup is wired to the test circuit. At the same time, one group of ten trunk terminal sets appearing in the district selector frame is also wired to the test equipment.

In the drawings, only one set of line terminals has been shown. The tip terminal 333, ring terminal 332 and sleeve terminal 327 are wired in the usual manner to the distributing rack 370 and to the line relay 372 and cut-off relay 371. The metering terminal 380 is connected over the back contact of the line relay 372 to distributing rack 373. The ring terminal of each of the ten sets of line terminals selected for test purposes is cross-connected to one of the upper front contacts of relay 526, while the metering terminal is cross-connected to one of the lower front contacts of relay 526. It will be obvious that a plurality of simultaneously operated relays may be substituted for relay 526. The tip and ring terminals of the test trunk group used for the present test are multipled together and are connected to contacts of relay 412. Only five sets of trunk terminals have been shown but a total of ten would be employed.

When a test is to be started, selectors 500 and 510 are determined to be on terminal 1. Start key 520 is operated closing a circuit from ground over brush 515, left operated contact of key 520, winding of relay 413 to battery. Relay 413 locks over its right front contact to ground at the back contact of relay 410. It also closes a circuit from ground at its inner left contact, over brush 503 in position 1, winding of relay 526 to battery. Relay 526, in operating, connects the ring and metering terminals of the ten test lines on the first line finder frame through to the test circuit. Relay 413 also connects ground from the right back contact of relay 403 over the outer left contact of relay 413 to interrupter 407. When interrupter 407 closes its left contact, it operates relay 406 which locks under the control of relay 403 in turn operating relay 409 which locks to ground at the left back contact of relay 422. Relay 409 connects ground over its left contact and the back contact of relay 408 to the windings of relays 522, 523, etc., in parallel. There are ten relays, such as relays 522 and 523, each of which connects ground through a resistance, such as resistances 524 and 525, to the ring terminal of the corresponding terminal set. For example, relay 522 closes a circuit from ground over its front contact, through resistance 524, outer upper contact of relay 526, conductor 374, cross-connecting rack 370, inner left back contact of cut-off relay 371 to the winding of line relay 372 and battery. In each case the line relay functions as described in the above identified Johnson patent to summon an idle line finder-district selector unit which operates to find the calling terminal set.

There is an interval of a little more than nine seconds between the closure of the left contact of interrupter 407 and the closure of its right contact, which interval covers the time required for the line finder to find a line and to connect with a sender and therefore corresponds to the time of waiting for dial tone in a regular service connection. When interrupter 407 closes its right contact, ground is connected over the left front contact of relay 406 through the winding of relay 405 to battery. Relay 405 also locks under the control of relay 403 and connects ground over its left front contact and the left back contact of relay 403 to conductor 425 associated with the pulsing relays 415 and 421 which furnish the make-and-break periods required for dial pulsing.

When relay 405 connects ground to conductor 425, a circuit is closed from grounded conductor 425 through resistance 419, tip contact of jack 414, winding of relay 421, resistance 417, right winding of relay 415, ring contact of jack 414 to battery through resistance 416. Relay 415 operates in this circuit, connecting ground from conductor 425 to resistance 416 and battery in shunt of the windings of relays 415 and 421. A circuit also existed from battery through resistance 416, lowermost contact of jack 414, left winding of relay 415, middle lower contact of jack 414, through condenser 418 to grounded conductor 425 over which condenser 418 is charged. The shunting of relays 415 and 421 tends to release them but it also causes the discharge of condenser 418 and the discharge current through the left winding of relay 415 causes relay 415 to remain operated for a definite length of time before releasing. The operation and release of relay 415 with relay 421 in series with its right winding is utilized for generating the dial pulses.

When the operating circuit for relay 526 was closed, a parallel circuit was closed from ground at the inner left contact of relay 413 over brush 514 in position 1, back contact and winding of magnet 511 to battery, advancing switch 510 to position 2. In this position a circuit is closed from battery through resistances 420 and 419 over the back contact of relay 421 to brush 516, winding of magnet 511 and battery. Terminals 2, 3 and 4 of brush 516 are connected to magnet 511 in order to allow relays 415 and 421 to reach a stable pulsing condition, the succeeding seven terminals being cross-connected in accordance with the first digit 7 to be dialed. These terminals are connected to the winding of relay 408 so that relay 408 operates and releases as relay 421 operates and releases. Each time that relay 408 operates, it opens the circuit of relays 522, 523, etc. sending a simulated dial pulse to the line relays, such as relay 372. With relay 408 operated, a circuit is closed from ground over the front contact of relay 409, front contact of relay 408 to the winding of magnet 511 which controls selector 510. Relay 424 operates in parallel with magnet 511 and closes a holding circuit for itself and magnet 511 over brush 515 until the magnet completely opens its back contact to insure that the selector 510 advances on each pulse.

Between the groups of terminals on the arcs of brushes 516 and 517, corresponding in number to the number of pulses for each digit, there are four terminals strapped together and connected directly to the winding of magnet 511. In these positions of switch 510, relay 408 does not function, but selector 510 is advanced four steps under the control of relay 421. The time taken to advance these four steps constitutes the interval between digits. The second digit, represented as 1, is sent out by operating relay 408 over brush 516 and is followed by a second interval of four steps. The third digit has been represented as 5, including two steps of brush 516 and three steps by brush 517 which comes into effective position at the time brush 516 becomes ineffective. The code 715 has been selected simply as an example, the proper code being used to cause the district selectors to select the group of trunks connected with the test circuit. Since no selections are to be made beyond the district, no additional digits need be transmitted. When the last impulse has been transmitted, brush 512 steps onto the first of the spare terminals which are strapped together and connected to ground, thereby advancing brush 512 to position 15.

It may be noted that brushes 514, 515 and 516 are effective during the first half rotation of selector 510, while brushes 512, 513 and 517 become effective during the second half revolution. Terminal 15 of the arc served by brush 512 is, therefore, position 37 or switch 510, but for simplicity in tracing the operation of the circuits, the twenty-two positions of the first half rotation will be ignored in the remainder of the description.

With brush 513 in position 15, a circuit is closed from ground over brush 513 through the winding of relay 403 to battery. Relay 403 operates, locking under the control of relay 410 and disconnecting ground from the pulsing relays 415 and 421. Relay 403 also opens the locking circuit of relays 405 and 406 and these relays release. With both of these relays normal, a circuit is closed from ground over the back contacts of relays 405 and 406, brush 512, contact and winding of magnet 511 to battery, advancing the selector to position 16.

A circuit is then closed from battery through the winding of relay 412 over brush 513 to ground. Relay 412 reverses the connection of battery and ground to the tip and ring terminals of the group of trunks thereby preventing the premature operation of the polarized supervisory relays in the district selectors. Relay 412 connects ground over its inner left contact to interrupter 407 which, on closing its left contact operates relay 406 and on closing its right contact nine seconds later, operates relay 405. Both relays lock to ground over the outer left contact of relay 413 and the inner left contact of relay 412. During this time interval the district selectors are operated by the sender and hunt for an idle set of terminals in the group. As each selector finds a trunk, it marks that set of terminals busy and the other selectors pass it. Therefore, one selector is connected to each of the ten sets of terminals.

Since relay 403 is now operated, the operation of relay 405 closes a circuit from ground at the left front contact of relay 405, left front contact of relay 403, terminal 16 of brush 512, back contact and winding of magnet 511, and battery, thereby advancing selector 510 to position 17. The advance of the selector opens the circuit of relay 412 and the connection of battery and ground to the trunk terminals is restored. With battery connected to the ring terminals and ground to the tip terminals of the trunk group, the current flow through the supervisory relays, such as relay 627, is in the proper direction to operate them and the completion of a connection is indicated to the ten district selectors simultaneously. The release of relay 412 also releases relays 405 and 406. With both of these relays released, ground is connected over their back contacts and the seventeenth terminal of brush 512, back contact and winding of magnet 511, advancing the selector 510 to position 18.

The metering lead from each test line is connected over an individual lower contact of relay 526 to the winding of a separate metering relay. For example, conductor 375 is connected over the innermost lower contact of relay 526 to the winding of relay 703 and the corresponding conductor of the tenth test line is connected over the lowermost contact of relay 526 to the winding of relay 713. When the timing sequence switch 800 and the message register connector circuit function, as outlined above, and as more completely described in the Johnson et al. patent, battery is connected over the left front contact of relay 115, inner lower front contact of relay 344, conductor 346, upper contacts of cam 844, conductor 310, brush 381, terminal 380, back contact of line relay 372, cross-connecting rack 373, conductor 375, inner lower front contact of relay 526, winding of relay 703 to ground. As each selector is ready for metering it seizes the message register connector circuit and in its turn connects metering potential to the metering terminal of the associated line terminal set and operates the corresponding metering relay.

Assuming that the district selector of Figs. 3 and 6 has been operated for a call to zone 2 and that relay 703 is the first metering relay to be operated, a circuit is closed from ground at the right front contact of relay 703, normal contact of key 700, through the left winding of relay 705 to battery. Relay 705 locks in a circuit from battery through its right winding and right contact to ground at the back contact of relay 423.

A set of relays, such as relays 703 to 709 inclusive, is provided for each of the ten test lines and as each selector applies metering current operating the corresponding metering relay, a relay similar to relay 705 is operated and locked. When the metering pulse ceases, relay 703 releases closing a circuit from ground at its back contact over the inner left front contact of relay 705 through the left winding of relay 704 to battery, relay 704 locking under the control of relay 705. When the second impulse of current is received, a circuit is closed from ground over the right front contact of relay 703, left front contact of relay 704, left winding of relay 706 to battery. Relay 706 locks through its right winding and right front contact to ground at the inner left back contact of relay 422. At the termination of the second metering impulse, a circuit is closed from ground over the back contact of relay 703, inner left contact of relay 705, normal contact of key 701, inner left contact of relay 706, winding of relay 708 to battery. Relay 708 locks over its right front contact to ground at the outer left contact of relay 706. Similarly, if the metering impulses are properly transmitted, the corresponding relays in the remaining registering groups are operated. Since relay 708 is the first to operate, a circuit is closed from ground over its outer left front contact, terminal 18 of brush 512, back contact and winding of magnet 511 and battery, advancing selector 510 to position 19. The first relay to operate of the relays 708, 718, etc., performs the function of advancing switch 510. When switch 510 reaches position 19, a circuit is closed from ground, over brush 513 and its nineteenth terminal to the timer 528. At the same time, a circuit is closed for lamp 529 to indicate that the timer is working. This timer, which would be an accurate electrically controlled mechanism, is arranged to count time for a period of five minutes and then to connect ground to conductor 530. This completes a circuit over terminal 19 of brush 512, over the back contact of magnet 511, through the winding of that magnet to battery advancing switch 510 to position 20.

In this position, ground from brush 513 is connected to the windings of relays 422 and 423 in parallel and these relays operate, opening the locking circuits for relays 409, 705, 706, 715 and 716 and the corresponding relays of the other registering groups, in turn releasing relays 704, 708, 714, 718, etc. Relay 422 closes a circuit from ground over interrupter 411 and the right contact of relay 422 to the winding of magnet 511 and battery, advancing selector 510 to position 22 under the control of the interrupter. Relay 409 releases relays 522, 523, etc., releasing all of the district selectors.

During the five-minute interval measured by timer 528 the metering relays remain connected to the metering terminals and if any one of the selectors connects metering battery to its metering terminal before the end of the five-minute interval, the corresponding relays such as relay 703 would operate closing a circuit over the left contact of relay 703, inner left front contact of relay 708, through the winding of relay 707 to battery. Relay 707 if operated, locks to ground on the start key 520. If none of the district selectors meter falsely, when switch 510 reaches position 22 a circuit will be closed from battery through the winding of relay 410, over the back contact of relays 707, 717, etc. in series, brush 513 to ground. Relay 410 connects interrupter 411 over its left contact to the winding of magnet 511, advancing selector 510 to position 1. Relay 410 also connects ground over its right front contact, key 521 to the winding of magnet 501 and battery. When selector 510 advances from terminal 22 the circuit of relay 410 is opened, in turn opening the circuit of magnet 501 and advancing selector 500 to the next set of terminals. The advance of selector 500 releases relay 526 and operates the corresponding relay of the next line finder frame. Selector 510 then performs its cycle of operations in connection with the second line finder frame, after which selector 500 is advanced to the next frame and so on, until all of the frames have been given a check test.

This time checking arrangement would be semi-portable so that it might be used first in one office and then another and the same codes might, therefore, represent an office in zone 1 to some offices and in zone 2 to other offices. Therefore, keys 700 and 701 have been provided by which the checking circuit is adapted to receive either one or two metering pulses. These two keys and the corresponding keys 710 and 711, etc. of the other registering units operate as a single key. When in the position shown they adapt the register unit to receive two metering impulses. If the keys are thrown to the left the circuit is arranged to function with a single metering impulse. In this case, the first operation of relay 703 closes a circuit from ground at its right front contact, over the alternate contact of key 700, through the left winding of relay 706 to battery, relay 706 locking as above described. When relay 703 releases it closes a circuit from ground at its back contact over the alternate contact of key 701 and the inner left contact of relay 706 to the winding of relay 708 and battery, relay 708 locking as before under the control of relay 706. If relay 703 reoperates falsely it closes a circuit from ground over its left contact, inner left contact of relay 708, through the winding of relay 707 and battery, relay 707 locking under the control of the start key 520. Keys 700 and 701 are placed in the proper position to agree with metering to be expected from the code transmitted by the wiring of brushes 516 and 517.

There is a message register, such as register 709, connected with each of the ten register units. The object of this register is to indicate the number of calls handled by each register unit. Should one of the ten lines become defective so that the corresponding district selector does not reach the terminating test line, the lower reading of this register as compared with the other nine registers would indicate this condition.

If, after the receipt of the initial charge, an additional charge is received before the end of the five-minute interval, for example over the district selector of Figs. 3 and 6, relay 707 is operated as above described. The operation of this relay lights lamp 702 in a circuit from ground at its inner right contact, through lamp 702 to battery through the winding of relay 401. Relay 401 closes an obvious circuit for alarm bell 400 to indicate that a false charge has been received. Relay 707 also closes a circuit from ground at its outer right contact, through resistance 524, uppermost contact of relay 526, to conductor 374, thereby holding relay 320 operated and preventing the release of the faulty district selector. Relay 707 also opens a link in the chain circuit by which selector 510 is advanced out of position 22. At the end of the five-minute interval measured by timer 528, selector 510 which stands in position 19 during this interval is advanced to position 20 where relays 422 and 423 are operated, releasing the relays of the registering units which have operated correctly, releasing relay 409 and thereby releasing relays 522, 523, etc. to permit the restoration of all of the district selectors which have operated properly. Since relay 707 is locked to key 520 it is unaffected by the operation of relays 422 and 423 and it likewise prevents the release of the associated district selector.

If no charge is received on any of the register units none of the relays, such as relay 708, is operated and no circuit is closed for advancing selector 510 from position 18. With brush 513 in position 18 a circuit is closed from battery through the winding of relay 404, over brush 513 to ground. Relay 404 connects ground over its right contact to interrupter 407 which operates relay 406 when it closes its left contact. Relay 406 locks over the contacts of relays 413 and 404. After an interval of nine seconds interrupter 407 operates relay 405 which also locks to relay 404. Normally, the operation of one of the relays 703, 718, etc. advances brush 513, releasing relays 404 and 406 before the circuit of relay 405 is closed. If at the end of this time, no charge whatever has been received, a circuit is closed from ground over the left front contact of relay 405, left front contact of relay 404, through lamp 402 and the winding of relay 401 to battery, lighting the lamp and ringing bell 400.

If at any time, it is desired to stop the progress of the testing circuit, key 520 may be restored. If dialing is in progress the dialing of the code will be continued as will district selection and trunk hunting. A path is provided for advancing selector 510 from the waiting charge position 18, which extends from battery through the winding of magnet 511, back contact of magnet 511, brush 512, normal left contact of key 520, over the locking circuit of relay 413 to ground at the back contact of relay 410. It is also advanced out of the timing position 19 by a circuit from battery through the winding and back contact of magnet 511, brush 512, right normal contact of key 520 to ground. It is advanced through positions 20 and 21 by the operation of relays 422 and 423 as previously described and, since key 520 releases all of the false charge relays such as relay 707, the circuit for operating relay 410 is ready and selector 510 is advanced to normal.

What is claimed is:

1. In a telephone system, unitary means for originating a plurality of telephone connections simultaneously, for simultaneously completing said plurality of connections, and for maintaining said connections for a predetermined period of time.

2. In a telephone system, means for originating a plurality of telephone connections simultaneously, means for simultaneously completing said plurality of connections, means in each connection for performing a metering function at predetermined intervals, means for timing said interval, means responsive to a first metering function to start said timing means, and means responsive to the complete operation of said timing means to terminate said connections.

3. In a telephone system, means for originating a plurality of telephone connections simultaneously, means for simultaneously completing said plurality of connections, means in each connection for performing a metering function at predetermined intervals, means for timing said interval, means responsive to a first operation of the metering means in one of said connections to start said timing means, means responsive to the complete operation of said timing means to terminate said connections, and means effective if the metering means of said one connection is reoperated prior to the complete operation of said timing means to sound an alarm.

4. In a telephone system, means for originating a plurality of telephone connections simultaneously, means for simultaneously completing said plurality of connections, means in each connection for performing a metering function at predetermined intervals, means for timing said interval, means responsive to a first operation of the metering means in one of said connections to start said timing means, means responsive to the complete operation of said timing means to terminate said connections, and means effective if the metering means of said one connection is reoperated prior to the complete operation of said timing means to mark said one connection.

5. In a telephone system, means for originating a plurality of telephone connections simultaneously, means for simultaneously completing said plurality of connections, means in each connection for performing a metering function at predetermined intervals, means for timing said interval, means to record the first metering function of each of said connections, means responsive to said first metering function to start said timing means, means responsive to the complete operation of said timing means to terminate said connections, and means effective if the metering means of any of said connections is reoperated prior to the complete operation of said timing means to sound an alarm.

6. In a telephone system, means for originating a plurality of telephone connections simultaneously, means for simultaneously completing said plurality of connections, means in each connection for performing a metering function at predetermined intervals, means for timing said interval, means to record the first metering function of each of said connections, means responsive to said first metering function to start said timing means, means responsive to the complete operation of said timing means to terminate said connections, and means effective if the metering means of any of said connections is reoperated prior to the complete operation of said timing means to mark the connection on which said reoperation takes place.

7. In a telephone system, means for originating a plurality of telephone connections simultaneously, means for simultaneously completing said plurality of connections, means in each connection for performing a metering function at predetermined intervals, means for timing said interval, means to record the first metering function of each of said connections, means responsive to said first metering function to start said timing means, means responsive to the complete operation of said timing means to terminate said connections, means effective if the metering means of any of said connections is reoperated prior to the complete operation of said timing means to hold the connections on which said reoperation takes place, and means responsive to the complete operation of said timing means to terminate the remainder of said connections.

8. In a telephone system, means for establishing telephone connections, means in each of said connections responsive to the completion thereof to perform a metering operation at predetermined intervals, and means for testing the accuracy of said metering operations comprising means for operating a plurality of said connection establishing means, means for simultaneously indicating the completion of a connection to said plurality of connection establishing means, means for registering the operations of said metering means, alarm mechanism in said testing means, and means to render said alarm mechanism unresponsive to failures of said registering means to operate, and responsive to false operations of said registering means.

9. In a telephone system, means for establishing telephone connections, means in each of said connections responsive to the completion thereof to perform a metering operation at predetermined intervals, and means for testing the accuracy of said metering operations comprising means for operating a plurality of said connection establishing means, means for simultaneously indicating the completion of a connection to said plurality of connection establishing means, and means for registering the operation of said metering means, said testing means indicating failures of said registering means to operate and sounding an alarm in response to over-operation of said registering means.

10. In a telephone system, means for establishing telephone connections, means in each of said connections responsive to the completion thereof to perform a metering operation at predetermined intervals, and means for testing the accuracy of said metering operations comprising means for operating a plurality of said connection establishing means, means for simultaneously indicating the completion of a connection to said plurality of connection establishing means, means for registering the operation of said metering means, an alarm mechanism and means for operating said alarm mechanism if none of said registering means is operated.

11. In a telephone system, means for establishing telephone connections, means in each of said connections responsive to the completion thereof to perform a metering operation at predetermined intervals, and means for testing the accuracy of said metering operations comprising means for operating a plurality of said connection establishing means, means for simultaneously indicating the completion of a connection to said plurality of connection establishing means, means for registering the operation of said metering means, and an alarm mechanism unresponsive to failures of one or more of said registering means to operate and responsive to failure of all of said registering means to operate.

12. In a telephone system, means for simultaneously initiating the establishment of a plurality of telephone connections, means in each connection for performing a metering function at predetermined intervals, means for timing said interval, means responsive to a first metering function to start said timing means, means responsive to the complete operation of said timing means to terminate said connections and means effective if the metering means of any of said connections is reoperated prior to the complete operation of said timing means to sound an alarm.

13. In a telephone system, means for simultaneously initiating the establishment of a plurality of telephone connections, means in each connection for performing a metering function at predetermined intervals, means for timing said interval, means responsive to a first metering function to start said timing means, means responsive to the complete operation of said timing means to terminate said connections and means effective if the metering means of any of said connections is reoperated prior to the complete operation of said timing means to mark the connections on which said reoperation takes place.

14. In a telephone system, means for simultaneously initiating the establishment of a plurality of telephone connections, means in each connection for performing a metering function at predetermined intervals, means for timing said interval, means responsive to a first metering function to start said timing means, means responsive to the complete operation of said timing means to terminate said connections and means effective if the metering means of any of said connections is reoperated prior to the complete operation of said timing means to hold the connections on which said reoperations take place.

15. In a telephone system, means to originate a plurality of telephone connections, means to simultaneously complete said connections, means in each connection responsive to the completion of the connection to perform a metering operation, a timing device, means responsive to a first operation of the metering means in one of said connections to start the timing device and means effective if the metering means of any of said connections is reoperated prior to the complete operation of said timing device to mark the connection on which said reoperation occurs.

16. In a telephone system, a plurality of conversational links arranged in groups and subgroups, and having access to outgoing terminals, means associated with each link responsive to the completion of a connection through said link to perform a metering operation at predetermined intervals, and means for testing the accuracy of said metering operation comprising means for initiating the operation of a random one of said conversional links in each of a plurality of subgroups, means for directing said links to a group of terminals equal in number to the number of subgroups, means for simultaneously simulating the completion of a connection over all of said terminals, timing means, means for recording the metering operation of each link, means responsive to the first operation of one of said recording means to start said timing means and means responsive to the reoperation of any one of said recording means prior to the complete operation of said timing means to hold the link which caused said reoperation.

17. In a telephone system, means for orinigating a plurality of telephone connections simultaneously, means for simultaneously completing said plurality of connections, means in each connection for performing a metering function at predetermined intervals, timing means, means responsive to a first metering function to start said timing means, means effective if said metering function is repeated prior to the complete operation of said timing means to sound an alarm, and means to adapt said responsive means to respond to a metering function comprising either one or two applications of metering potential.

18. In a testing system, means for simultaneously seizing a plurality of circuits, means for simultaneously performing the same timed metering test on each circuit and means responsive to the satisfactory operation of said circuit to advance said test to make a similar simultaneous test on a second plurality of circuits.

GEORGE A. HURST.
JOHN B. RETALLACK.